L. B. CODDINGTON & W. W. FRENCH.
HARROWS.
No. 193,692. Patented July 31, 1877.
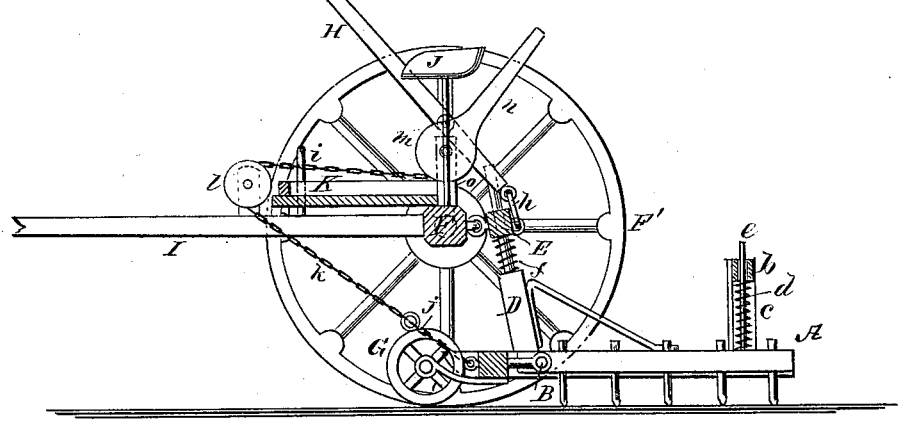
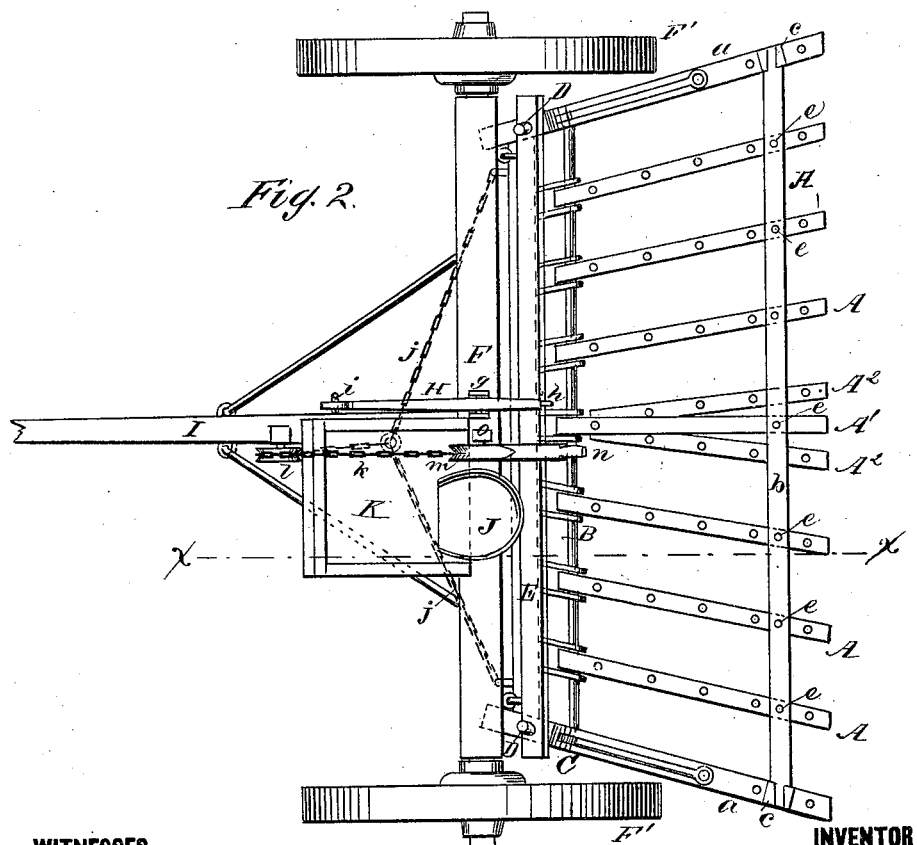

UNITED STATES PATENT OFFICE.

LEWIS B. CODDINGTON AND WILLIAM W. FRENCH, OF WESTFIELD, N. J.

IMPROVEMENT IN HARROWS.

Specification forming part of Letters Patent No. 193,692, dated July 31, 1877; application filed May 28, 1877.

*To all whom it may concern:*

Be it known that we, LEWIS B. CODDINGTON and WILLIAM W. FRENCH, of Westfield, county of Union, and State of New Jersey, have invented a new and useful Improvement in Harrows, of which the following is a specification:

Figure 1 is a vertical transverse section, taken on line $x\,x$ in Fig. 2. Fig. 2 is a plan view.

Similar letters of reference indicate corresponding parts.

The object of our invention is to provide a harrow which will yield to inequalities of the ground, and which may be readily moved from place to place.

In the drawing, A $A^1$ $A^2$ are harrow-bars, that are provided with ordinary harrow-teeth, and are hinged on the rod B, that passes through the end pieces $a$ of the frame C near its front side. The rear cross-bar $b$ of the frame C is supported a small distance above the end pieces $a$ by standards $c$, and between the said bar and the harrow-bars springs $d$ are placed on rods $e$, that project upward from the said bars through the bar $b$. The center bar $A^1$ is arranged at right angles to the axle of the harrow, and the adjacent bars $A^2$ are attached to it near its forward end, and extend backward diagonally in opposite directions. The bars A, as well as the ends of the frame C, are arranged parallel to the bars $A^2$, so that the bars on opposite sides of the center bar $A^1$ diverge. The forward side of the frame C is provided with two uprights, D, that pass through a bar, E, that is hinged to the axle F, which is supported by wheels F'. The uprights D are shouldered, and upon them springs $f$ are placed, which press against the bar E and hold the frame C down. A caster-wheel, G, is attached to the front of the frame C for supporting the said frame, both when in use and when raised for the purpose of moving it from place to place. A lever, H, is pivoted to standards $g$, that project upward from the axle F, and is connected, by a link, $h$, with the bar E. A hook, $i$, is attached to the tongue I, for holding the end of the lever H when it is desired to raise the harrow from the ground. Chains $j$ are attached to the ends of the frame C, and are connected with a chain, $k$, that runs over a pulley, $l$, at the side of the tongue I, and is attached to a sheave, $m$, formed on the end of the lever $n$, and pivoted to a standard, $o$, that projects upward from the axle F. A seat, J, is provided for the driver, and a platform, K, for the driver's feet.

The arrangement of the bars is such that all of the ground over which the harrow passes is operated upon by the harrow-teeth, and, by means of the springs, the teeth are held to the ground with sufficient pressure for ordinary work, while they are permitted to yield to the inequalities of the surface, or to obstructions.

By drawing the chains $j$ by means of the lever $n$, the harrow may be held to the ground with additional force.

Having thus fully described our invention, we claim as new and desire to secure by Letters Patent—

The bars A $A^1$ $A^2$, hinged upon the rod B, the frame C, having the cross-bar $b$ and uprights D, the springs $d$, rods $e$, springs $f$, hinged bar E, axle F, and wheels F', in combination, substantially as shown and described.

LEWIS B. CODDINGTON.
   WILLIAM W. FRENCH.

Witnesses:
 CHARLES H. FRENCH,
 JOHN PIERSON.